(12) United States Patent  
Düring (10) Patent No.: US 7,856,809 B2  
(45) Date of Patent: Dec. 28, 2010

(54) EXHAUST GAS POST TREATMENT SYSTEM

(75) Inventor: Andreas Düring, München (DE)

(73) Assignee: MAN Nutzfahrzeuge AG (DE)

( * ) Notice: Subject to any disclaimer, the term of this patent is extended or adjusted under 35 U.S.C. 154(b) by 706 days.

(21) Appl. No.: 11/839,651

(22) Filed: Aug. 16, 2007

(65) Prior Publication Data

US 2008/0041040 A1    Feb. 21, 2008

(30) Foreign Application Priority Data

Aug. 16, 2006   (DE) .................. 10 2006 038 288

(51) Int. Cl.
*F01N 3/00*    (2006.01)

(52) U.S. Cl. .............. 60/295; 60/286; 60/297; 60/301; 60/311; 55/DIG. 30; 502/305; 502/325; 502/349

(58) Field of Classification Search .......... 60/286, 60/295, 297, 301, 303, 311; 55/DIG. 30; 502/305, 325, 349

See application file for complete search history.

(56) References Cited

U.S. PATENT DOCUMENTS

| 4,902,487 A | 2/1990 | Cooper et al. |
| 6,718,757 B2* | 4/2004 | Khair et al. ................. 60/286 |
| 6,805,849 B1 | 10/2004 | Andreasson et al. |
| 6,928,806 B2 | 8/2005 | Tennison et al. |
| 7,062,904 B1* | 6/2006 | Hu et al. ..................... 60/286 |
| 7,210,288 B2* | 5/2007 | Bandl-Konrad et al. ....... 60/297 |
| 7,211,226 B2* | 5/2007 | Liu et al. ................... 422/168 |
| 7,313,911 B2* | 1/2008 | Pfeifer et al. ................ 60/286 |
| 7,662,744 B2* | 2/2010 | Kureti et al. ................ 502/305 |

FOREIGN PATENT DOCUMENTS

| DE | 34 28 232 | 2/1986 |
| DE | 40 38 054 | 6/1992 |
| DE | 102 25 975 | 1/2004 |
| DE | 102 57 113 | 6/2004 |
| DE | 103 23 607 | 12/2004 |
| DE | 103 35 785 | 3/2005 |
| EP | 1 072 765 | 1/2001 |
| JP | 2004-060494 | 2/2004 |
| JP | 2006-183507 | 7/2006 |
| WO | WO01/12320 | 2/2001 |

* cited by examiner

*Primary Examiner*—Binh Q. Tran
(74) *Attorney, Agent, or Firm*—Robert W. Becker; Robert Becker & Assoc.

(57) ABSTRACT

An exhaust gas post treatment system for nitrogen oxide and particle reduction of internal combustion engines operated with excess air, comprising a particle filter disposed in the exhaust gas stream of the internal combustion engine. The particle filter is a surface-type particle filter or a deep bed filter, and is charged on an outlet side with an SCR-active catalyst material for reducing nitrogen oxides. Ammonia or an ammonia-releasing reduction agent is supplied to the exhaust gas stream upstream of the particle filter.

10 Claims, 3 Drawing Sheets

EXHAUST GAS POST TREATMENT SYSTEM

The instant application should be granted the priority date of 16 Aug. 2006 the filing date of the corresponding Germany patent application DE 10 2006 038 288.9.

BACKGROUND OF THE INVENTION

The present invention relates to an exhaust gas post treatment system for internal combustion engines, such as diesel engines and gasoline engines having direct injection, that are operated with excess air.

Limited exhaust gas components, which result during combustion processes and the permissible emissions of which are continuously being lowered, include, in addition to solid particles, nitrogen oxides. To minimize these exhaust gas components with internal combustion engines operated in motor vehicles, various methods are presently used. The reduction of the nitrogen oxides generally occurs with the aid of catalysts, and in oxygen-rich exhaust gas a reduction agent is additionally required in order to increase the selectivity and $NO_x$ conversions. These methods have become known by the collective term SCR processes, whereby SCR stands for "Selective Catalytic Reduction". It has been used for many years in the power plant industry, and in recent times also with internal combustion engines, A detailed illustration of such processes can be found in DE 34 28 232 A1, $V_2O_5$-containing mixed oxides, for example in the form of $V_2O_5/WO_3/TiO_2$, can be used as SCR catalysts. Typical $V_2O_5$ proportions are between 0.2-3%. In practice ammonia, or compounds that release ammonia, such as urea or ammonium formate, in solid or dissolved form, are used as reduction agents. To convert one mol nitric oxide one mol ammonia is required.

$$4NO+4NH_3+O_2 \rightarrow 4N_2+6H_2O \tag{1}$$

If a platinum-containing NO-oxidation catalytic converter is disposed upstream of the SCR catalyst for the formation of $NO_2$, $$2NO+O_2 \leftrightarrow 2NO_2 \tag{2}$$

The SCR reaction can be considerably accelerated, and the low temperature activity can be significantly raised.

$$NO+2NH_3+NO_2 \rightarrow 2N_2+3H_2O \tag{3}$$

With internal combustion engines operated in vehicles the nitrogen oxide reduction with the aid of the SCR process is difficult for the reason that changing operating conditions exist that make the quantitative metering of the reduction agent difficult Although on the one hand as high a conversion of the nitrogen oxides as possible should be achieved, on the other hand care must be taken that there is no emission of unused ammonia. To provide a remedial measure, an ammonia-blocking catalytic converter is frequently disposed downstream of the SCR catalyst to convert excess ammonia into nitrogen and water vapor. The use of $V_2O_5$ as active material for the SCR catalyst can also pose a problem if the exhaust gas temperature at the SCR catalyst is greater than 650° C., because $V_2O_5$ then sublimates.

To minimize the very fine particles, not only in the power plant industry but also with vehicles, either so-called particle separators or particle filters are used. A typical arrangement having particle separators for use in vehicles is described, for example, in EP 1 072 765 A1. Such arrangements differ from those having particle filters in that the diameter of the channels of the particle separator are considerably greater than the diameter of the largest particle that is present, whereas with particle filters the diameter of the filter channels is in the range of the diameter of the particles. As a consequence of this difference, particle filters are subject to becoming clogged, which increases the exhaust gas counter pressure and reduces the engine power. An arrangement and a method using particle filters can be found in EP 0 341 832 A2. The two aforementioned arrangements or methods are characterized in that the oxidation catalytic converter, which is respectively disposed upstream of the particle separator or particle filter, and which is generally a catalyst having platinum as the active material, oxidizes the nitric oxide in the exhaust gas with the aid of the also-contained residual oxygen to nitrogen dioxide, which in turn is converted in the particle separator, or the particle filter, with the carbon particles to CO, $CO_2$, $N_2$, and NO. In this way, a continuous removal of the accumulated very fine particles is effected; expensive and/or complicated regeneration cycles, which must be carried out with other arrangements, are thereby eliminated.

$$2NO_2+C \rightarrow 2NO+CO_2 \tag{4}$$

$$2NO_2+C \rightarrow 2NO+CO \tag{5}$$

$$2C+2NO_2 \rightarrow N_2+2CO_2 \tag{6}$$

In order to fulfill the exhaust gas regulations that will be applicable in the future it is necessary to simultaneously use not only arrangements for reducing nitrogen oxide emissions, but also arrangements for reducing the emission of very fine particles. For this purpose, already various arrangements and methods have become known.

DE 103 48 799 A1 describes an arrangement that is comprised of an oxidation catalytic converter an SCR catalyst disposed downstream thereof in the exhaust gas stream, and a particle filter that in turn is disposed downstream of the SCR catalyst in the exhaust gas stream. The supply of the reduction agent for the selective catalytic reaction that takes place in the SCR catalyst is effected immediately prior to the SCR catalyst via a urea injection device that is controlled as a function of operating parameters of the internal combustion engine. The drawback of this arrangement is that the nitrogen dioxide produced in the oxidation catalytic converter is essentially completely used up by the selective catalytic reduction in the SCR catalyst, in other words, is no longer available for the conversion of the very fine particles that have accumulated in the downstream particle filter. The regeneration of the particle filter must therefore be realized by an expensive and/or cyclical heating-up of the exhaust gas stream by enriching the exhaust gas stream with non-combusted hydrocarbons. This occurs either by enriching the combustion mixture or introducing fuel ahead of the particle filter. Such an arrangement for regenerating the particle filter is on the one hand complicated and hence expensive, and on the other hand the cyclical regeneration of the particle filter disposed at the end of the arrangement again produces harmful materials that can no longer be removed from the exhaust gas.

A further combination of a particle filter and an arrangement for the selective catalytic reduction is known from EP 1 054 722 A1. The arrangement described therein comprises an oxidation catalytic converter that is disposed in the exhaust gas stream and that increases the proportion of nitrogen dioxide in the exhaust gas, a fine material filter disposed downstream thereof, a reservoir for the reduction liquid, as well as an injection device for the reduction fluid that is disposed behind the fine material filter, and additionally an SCR catalytic converter disposed downstream in the exhaust gas stream. Although the above-described arrangement permits a continuous conversion of the fine material particles of the carbon type accumulated in the fine material filter with the aid of the nitrogen dioxide produced in the oxidation catalytic converter, it has another very serious drawback. The particle filter causes a cooling of the exhaust gas, so that for example with the use of the presently commercially available reduction liquid designated AdBlue, the exhaust gas temperature, in particular after start-up of the internal combustion engine, or during operation of the internal combustion engine in a lower output range, is too low to produce ammonia without yielding problematic byproducts from the 33% aqueous urea solution.

In conjunction with the decomposition of urea $((NH_2)_2CO)$ into ammonia $(NH_3)$, it is known that this occurs under optimum conditions (temperatures greater than 350° C.) in two stages; according to (7)

there is first effected the thermolysis, or pyrolysis, i.e. the thermal decomposition of urea. Subsequently, according to (8)

there is effected the hydrolysis, in other words, the catalytic conversion of isocyanic acid (HNCO) into ammonia $(NH_3)$ and carbon dioxide $(CO_2)$.

Since with the use of AdBlue the reduction agent is present in a form dissolved in water, this water must be evaporated prior to and during the actual pyrolysis and hydrolysis.

If the temperature present with the previous reaction according to (7) and (8) is less than 350° C. or is heated only slowly, it is known from DE 40 38 054 A1 that essentially solid, non-meltable cyanuric acid results from trimerization of the isocyanic acid formed according to (7) pursuant to (9)

which leads to clogging of the following SCR catalytic converter. Remedial action can as outlined in the aforementioned DE 40 38 054, be provided by guiding the exhaust gas stream that is laden with the reduction agent over a hydrolysis catalytic converter. The exhaust gas temperature from which a quantitative hydrolysis is possible can thus be depressed to 160° C. The construction and composition of an appropriate catalytic converter is also described in the aforementioned publication as are the construction and function of an SCR catalytic converter system that is equipped with a hydrolysis catalytic converter.

Proceeding from the previously described state of the art, it is an object of the present invention, while avoiding the drawbacks of the known arrangements, to provide an exhaust gas post treatment system for nitrogen oxide and particle reduction of internal combustion engines operated with excess air, which reduces not only the particle emission but also the nitrogen oxide emission, and which has a minimal overall size by combining components and functions.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

Pursuant to the present application, an exhaust gas post treatment system is provided for nitrogen oxide and particle reduction of internal combustion engines operated with excess air, whereby the nitrogen oxide reduction is effected via an SCR catalyst and the particle reduction is effected via a particle filter, whereby the particle filter is disposed in the exhaust gas stream of the internal combustion engine and is a surface-type particle filter or a deep bed filter, whereby the particle filter is charged on its outlet side with an SCR-active catalyst material, and wherein the supply of ammonia or an ammonia-releasing reduction agent is effected upstream of the particle filter.

The realization of the object of the present application is based on achieving the required exhaust gas threshold values in that the nitrogen oxide reduction is effected by an SCR catalyst with the aid of ammonia, and the particle reduction is realized by means of a particle separator or a particle filter. The exhaust gas post treatment system of the present application provides a particle filter in the exhaust gas stream of the internal combustion engine, wherein the particle filter is a surface-type particle filter or a deep bed filter. To carry out the selective catalytic reduction of the nitrogen oxides, the particle filter is charged on its outlet side with an SR-active catalyst material. The supply of ammonia or ammonia-releasing reduction agent, which is necessary for the production of the ammonia, is effected upstream of the particle filter. The advantage of such an arrangement is on the one hand in the minimized overall size, and hence the minimized space required for installation of the system into a vehicle, and on the other hand due to the filter material of the particle filter an adequate interval is provided between the oxidation of the accumulated carbon particles that takes place on the inlet side of the particle filter and occurs exothermally, and the charging of the particle filter with SCR-active catalyst material provided on the outlet side. The high temperatures that result during the oxidation of the carbon particles can thus not damage the SCR-active catalyst material Materials suitable for the particle filter, with regard to the charging with SCR-active catalyst material, are advantageously cordierite or silicon carbide, or sintered metal or ceramic fibers or silicon fibers or metal weave.

It is expedient and hence advantageous if the charging with the SCR-active catalyst material on the outlet side of the particle filter increases in the direction of flow of the exhaust gas. The appropriate distribution of the SCR-active material can be achieved if the particle filter is built up in layers, whereby the layers on the outlet side have a charging with the SCR-active material that increases in the direction of flow of the exhaust gas. It is, of course, also possible to undertake the loading with the SCR-active material by coating or impregnating the outlet side of the particle filter in such a way that the degree of the charging of the filter material decreases as the penetration depth of the coating or impregnation solution increases. The SCR-active catalyst material with which the particle filter is charged can, as active components, contain vanadium and/or $V_2O_5$ and/or $WO_3/TiO_2$ and/or iron-containing zeolites and/or copper-containing zeolites and/or cobalt-containing zeolites.

To facilitate the release of ammonia from the reduction agent, it is furthermore advantageous to additionally coat or impregnate the inlet side of the particle filter with an appropriately active catalyst material. Active components for such a catalyst material include $TiO_2$ and/or $TiO_2/SiO_2$ and/or $TiO_2/SiO_2/Al_2O_3$ and/or zeolites.

To avoid $NH_3$ that is possibly not used during the SCR reaction from passing into the atmosphere, it is advantageous to additionally coat or impregnate the outlet side of the particle filter, at the end of the charge with SCR-active catalyst material as viewed in the direction of flow of the exhaust gas, with a catalyst material that oxidizes excess ammonia that is present in the exhaust gas. Catalyst materials suitable for this purpose for the oxidation of excess ammonia can, as active components, contain elements from the platinum group and/or oxides thereof and/or zeolites.

It is further more advantageous to dispose an oxidation catalytic converter upstream to the supply of the reduction agent, wherein the oxidation catalytic converter converts at least a portion of the nitric oxide contained in the exhaust gas stream into nitrogen dioxide. As a consequence of this measure, a continuous oxidation of the carbon particles accumulated on the particle filter is possible pursuant to the equations (4) to (6), whereby the temperature level is lower than is the case with a cyclical regeneration of the particle filter by, for example, enriching the combustion mixture or by adding hydrocarbons into the hot exhaust gas. Platinum and/or platinum oxide and/or zeolites are suitable as active material for the oxidation catalytic converter for the conversion of nitric oxide into nitrogen dioxide.

In conjunction with the foregoing discussion, the advantage of the exhaust gas post treatment system of the present application becomes particularly clear; it the entire particle filter, and thus also the inlet side thereof, were to be provided with SCR-active coating, this would lead, according to equation (3), to pronounced reduction of the $NO_2$ concentration on the inlet side, as a result of which the oxidation of the carbon separated there, and hence the filter regeneration with the aid of $NO_2$, would be significantly adversely affected.

Pursuant to a particularly expedient and hence advantageous embodiment of the particle filter, it can form blind hole-like or pocket-like chambers not only on its inlet side but also on its outlet side, whereby those chambers disposed on the inlet side are open toward the inlet side, and those chambers disposed on the outlet side are open toward the outlet side.

Further specific features of the present invention will be described in detail subsequently.

DESCRIPTION OF SPECIFIC EMBODIMENTS

Figure 1:
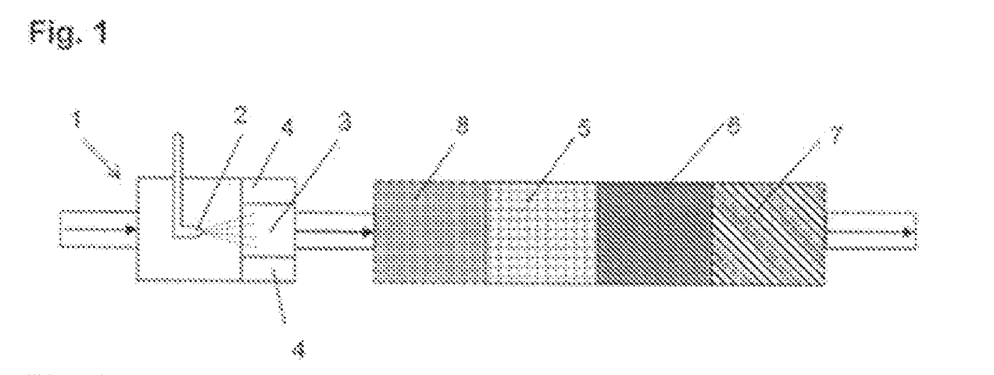
FIG. 1 is an illustration of an exhaust gas post treatment system.

Referring now to the drawings in detail, an exhaust gas post treatment system for the selective catalytic reduction and for the reduction of solid particles in the exhaust gas of an internal combustion engine is schematically illustrated in FIG. 1. The exhaust gases, which are produced from an internal combustion engine (not illustrated) by the combustion processes, and which are symbolized by the arrows in FIG. 1, first pass into an exhaust gas preparation section 1, in which a reduction agent is added to the hot exhaust gas as close to the engine as possible. As is common with motor vehicles having SCR catalytic converters, the reduction agent is an aqueous urea solution; it is, of course, also conceivable to add urea in solid form, as this is already described in detail in the pertinent technical literature. It is furthermore possible to add ammonia as the reduction agent which is recovered at some other location, for example under more favorable thermal conditions, from a material that releases ammonia. The metering or dosing is effected as a function of the operating parameters of the internal combustion engine controlled by an engine control unit (not illustrated), in such a way that via a nozzle 2, the aqueous urea solution is sprayed into a partial exhaust gas stream 3. Disposed parallel to the partial exhaust gas stream 3 is an oxidation catalytic converter 4, the task of which, pursuant to the reaction previously identified by (2), is to oxidize a portion of the nitric oxide contained in the exhaust gas to nitrogen dioxide by means of the excess oxygen present in the exhaust gas. The thus-produced nitrogen dioxide is used on the one hand during the reduction of the solid particles, and on the hand with the subsequent SCR reaction, as will be described in greater detail subsequently.

Disposed downstream of the partial exhaust gas stream 3, and of the oxidation catalytic converter 4 disposed parallel thereto, is a particle filter 5 which accumulates the carbon particles found in the exhaust gas. The carbon particles thus retained in the particle filter 5 are continuously converted to carbon monoxide, carbon dioxide, nitrogen and nitric oxide by the nitrogen dioxide produced upstream with the aid of the oxidation catalytic converter 4, thus eliminating expensive regeneration cycles for the particle filter 5.

The actual selective catalytic reduction of the nitrogen oxides is effected by an SCR catalyst 6, which in FIG. 1 for the sake of simplicity is actually schematically indicated as a separate component yet, as will be described subsequently, inventively is embodied as an SCR-active coating of the particle filter 5. In the indicated reduction reaction, as great a portion of the nitrogen oxides ($NO_x$) present in the exhaust gas as possible, with a simultaneously high selectivity of the reduction, should be converted into nitrogen and water vapor without excess ammonia ($NH_3$) remaining in the exhaust gas stream. With the indicated SCR reduction reaction, the residual nitrogen dioxide possibly still present in the exhaust gas stream is more reactive than is the remaining NO in the exhaust gas, so that it is desirable to design the oxidation catalytic converter 4 in such a way that as great a proportion of nitric oxide as possible is converted into nitrogen dioxide, in other words, if possible, more than is required for the con version of the carbon particles in the particle separator. Due to the highly exothermic carbon oxidation, a significant temperature increase can occur, so that downstream of the particle separator temperatures above 650° C. can readily occur that lead to damage of $V_2O_5$-containing SCR catalyst. For this reason, the use of SCR catalysts that are free of $V_2O_5$, which are generally based on iron, cobalt, or copper zeolite material, can be expedient.

In view of the constantly changing operating conditions of an internal combustion engine that operates in a motor vehicle, it is obvious that the desired, as high as possible, conversion rates of nitrogen oxides can reliably take place only if a slight ammonia excess is accepted. In order in situations of insufficient conversion to prevent toxic ammonia from being given off to the atmospheric air along with the partially cleaned exhaust gas, disposed downstream of the SCR catalyst 6 is an $NH_3$ oxidization catalyst 7, via which the excess $NH_3$ is converted into nitrogen and water vapor. The $NH_3$ oxidation catalyst 7, which in FIG. 1 is also schematically indicated as a separate component, can, as shown subsequently, also be a part of the combination of particle filter 5 and SCR catalyst. The oxidation reaction for the elimination of the excess ammonia should take place as selectively as possible, so that at least portions of iridium or iridium oxide should be used as active material for the $NH_3$ oxidation catalyst 7.

As further indicated in FIG. 1 with a dashed peripheral line, to improve the release of the ammonia from the reduction agent, a hydrolysis catalyst 8 can be used if the temperature level at the supply location for the reduction agent is not high enough. This hydrolysis catalyst 8 disposed in the exhaust gas stream downstream of the supply location of the reduction agent and upstream of the particle filter 5, is again schematically indicated in the drawing as a separate component, but can, as will be shown below, also be a charge on the inlet side of the particle filter 5, with appropriately active catalyst material.

Figure 2:
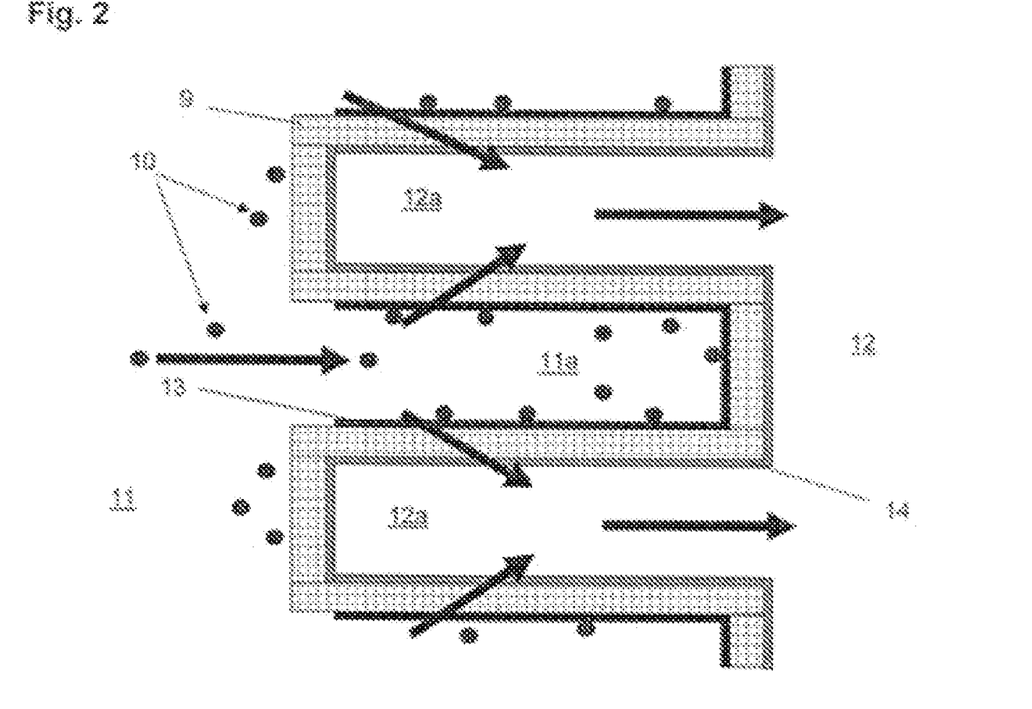
FIG. 2 shows a combination of particle filter and SCR catalyst.

The schematic cross-sectional view of FIG. 2 shows the embodiment of a particle filter having SCR activity, whereby the section plane is parallel to the direction of flow of the exhaust gas. In this connection, as is the case with FIGS. 3 to 5 described below, the directional flow is represented by arrows.

The particle filter 9, not only on its inlet side 11 but also on its discharge or outlet side 12, has blind hole-like or pocket-like chambers 11a, 12a, whereby those disposed on the inlet side 11 are open toward the inlet side and those disposed on the outlet side 12 are open toward the outlet side. Cordierite or silicon carbide, but also sintered meta or ceramic fibers as well as silica fibers or metal weave, can be used as filter material for the particle filter 9.

As can be seen in the drawing, the exhaust gas stream, which is laden with carbon particles 10 and with ammonia ($NH_3$) (not illustrated), encounters the inlet side 11 of the particle filter 9 and deposits the carbon particles 10 in particular in the blind hole-like or pocket-like chambers 11a as so-called filter cakes 13, before the exhaust gas, which is thus cleaned of carbon particles 10, flows through the filter material on the blind hole-like or pocket-like chambers 12a to the outlet side 12. Prior to reaching the chambers 12a, the exhaust gas that is laden with $NH_3$ flows through a layer of the particle filter 9 that is disposed on the outlet side 12 and is loaded with SCR-active catalyst material 14, and remains in contact with this layer until it flows out of the blind hole-like or pocket-like chambers 12a. On the way through the layer that is loaded with SCR-active catalyst material 14, as well as in the chambers 12a, the selective catalytic reduction takes place according the reactions (1) and (2), in which the nitrogen oxides are converted into nitrogen and water vapor. The exhaust gas, which is thus cleaned of carbon particles and nitrogen oxides, leaves the outlet side 12 of the filter arrangement.

For the regeneration of the particle filter 9, the filter cakes 13 must be removed either continuously or cyclically. The continuous removal of the filter cake 13, as already described in conjunction with FIG. 1, is realized by disposing upstream of the particle filter 9 an oxidation catalytic converter, which is not shown in FIG. 2, and which according to reaction (2) converts at least a portion of the nitric oxide present in the exhaust gas into nitrogen dioxide. The oxidation catalytic converter must also be disposed upstream of the location at which the reduction agent is added to the exhaust gas stream, since otherwise the reduction agent oxidizes and is therefore unusable for the SCR reaction.

The nitrogen dioxide in enriched in the exhaust gas, in contact with the filter cakes 13, according to the reactions (4), (5) and (6) effects a conversion of the carbon particles 10 into $CO$, $CO_2$, $N_2$, and $NO$, whereby these reactions take place continuously, so that the filter cakes can be kept at an essentially constant thickness and the exhaust gas counter pressure caused thereby can be kept at an essentially constant level.

As an alternative to the continuous regeneration of the particle filter 9, there is also the possibility of regenerating it cyclically. For this purpose, in a known manner the content of hydrocarbons in the exhaust gas is increased, so that in contact with the filter cakes the hydrocarbons oxidize the carbon particles 10 in a highly exothermic reaction.

The localized temperature increase at the inlet side 11 of the particle filter 9 that results in both cases of the regeneration of the particle filter 9 is screened relatively well by the filter material relative to the charge with SCR-active catalyst material 14 disposed on the outlet side 12 of the particle filter 9, so that there is no danger of damage to the SCR-active catalyst material. In order at critical temperature conditions to reliably preclude damage to the SCR-active catalyst material, $WO_3/TiO_2$ or iron-containing, copper-containing or cobalt-containing zeolite can also be used as catalyst material in place of the temperature-sensitive vanadium or $V_2O_5$.

For reasons of thermal stability, it can furthermore be advantageous if the charge of the SCR-active side of the particle filter increases in the direction of flow of the exhaust gas. This can be achieved either by building up the particle filter in layers, whereby the charge of the layers with SCR-active material increases in the direction of flow of the exhaust gas, or in that the charge with the SCR-active material is undertaken by coating or impregnating the outlet side of the particle filter in such a way that the degree of charging the filter material decreases as the penetration depth of the coating or impregnation solution increases.

Figure 3:
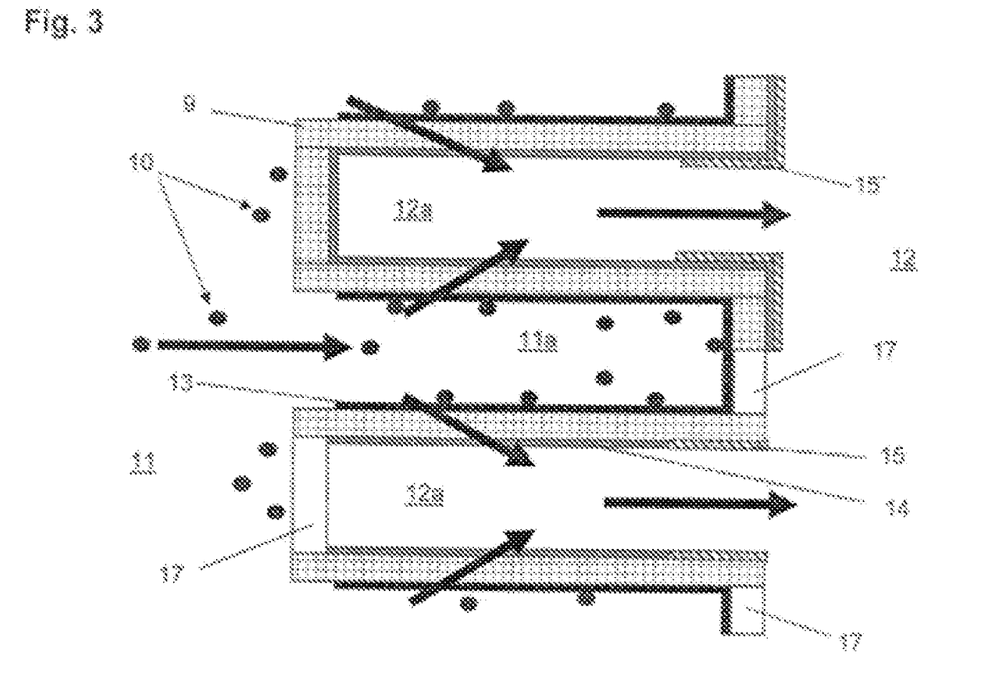
FIG. 3 shows a combination of particle filter, SCR catalyst, and $NH_3$-oxidation catalyst.

In order where operation of the internal combustion engine is intermittent, as is customary with internal combustion engines operated in vehicles) to obtain as high a conversion of nitrogen oxides to nitrogen and water vapor as possible, it is necessary to operate the exhaust gas post treatment system with a slight excess of ammonia. Since the toxic ammonia gas cannot be given off into the atmospheric air, it becomes necessary to provide an ammonia-oxidation catalyst at the end of the exhaust gas post treatment arrangement. Such an arrangement is schematically illustrated in FIG. 3. Here also a cross-sectional illustration is selected where the section plane extends parallel to the direction of flow of the exhaust gas. Since the illustration is FIG. 3 is to a large part the same as in FIG. 2, the same reference numerals are used for the same parts. To avoid repetition, these same parts will not be described again, with reference being made to the description of FIG. 2 for these parts.

For the oxidation of the excess ammonia in the exhaust gas, on the outlet side 12 of the particle filter 9, at the outlet of the blind hole-like or pocket-like chambers 12a, either an impregnation of the SCR-active catalyst material 12 with a material 15 for the oxidation of ammonia is undertaken (at the bottom of FIG. 3), or the SCR-active catalyst material 14 is coated with a material 15' for the oxidation of ammonia (at the top of FIG. 3). In both cases the excess ammonia is reliably converted into nitrogen and water vapor.

Manufacturing possibilities for the main body of the particle filter 9, in conjunction with FIG. 3, are similarly indicated by way of example and in principle. To produce a blind hole-like structure, a plurality of tubular structures can be combined to form a compact package, whereby respectively adjacent tubes are alternately closed off either toward the inlet side or toward the outlet side. The closing off can be effected with the same material that is also used for the particle filter 9, however, the material can also be different, for example neutral. A further possibility for producing the blind hole-like chambers 11a, 12a is to provide channels in a block-like filter body, with respectively adjacent ones of the channels being alternately closed off at the respectively opposite ends.

With the previously indicated structures, the charging with SCR-active catalyst material can be effected in that initially only each second opening on the outlet side 12 is dosed off, and the filter body is then immersed in a coating or impregnation solution, as a result of which the coating or impregnation solution can rise in those channels that are open toward the outlet side. After coating or impregnation has been effected, the excess coating or impregnation solution is again blown out, and the coated or impregnated channels are then closed off toward the inlet side 11.

One possible way of producing pocket-like structures is to produce packages of spaced-apart plates, whereby the adjacent free chambers that result from the spacing are respectively alternatingly closed off on the inlet side 11 and on the outlet side 12, thereby forming a pocket-like structure. The charging of the outlet side 12 with the SCR-active catalytic material 14 can be effected by charging the plates used for building up the structure on one side with SCR-active catalyst material, and layering the plates in such a way that alternately two charged plate sides and two non-charged plate sides are disposed opposite one another. In this connection, the charging of the plates can be effected by building up the plates in layers, whereby the degree of charging of the layers with SCR-active catalyst material increases in the direction of the outlet side. However, the possibility also exists of realizing the charging of the plates with SCR-active catalyst material by spraying, or coating with SCR-active coating or impregnation solutions. The production of the above described NH-active layers at the outlet of the arrangement is effected in an analogous manner. The same also applies to active layers of the particle filter 9 of the inlet side 11, as will be described subsequently in conjunction with FIG. 4.

Figure 4:
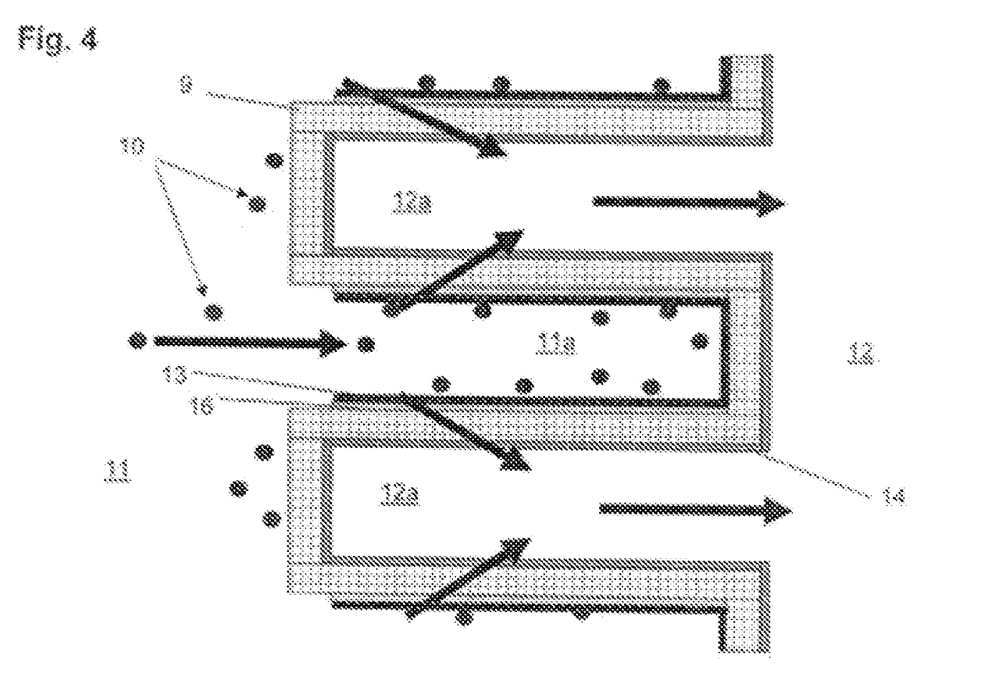
FIG. 4 shows a combination of particle filter, SCR catalyst, and hydrolysis catalyst.

As already described in conjunction with FIG. 1, to improve the release of ammonia from the reduction agent, for example aqueous urea solution (AdBlue), it can be necessary to use a catalyst that facilitates the release in order to prevent the formation of cyanuric acid pursuant to the reactions (7) and (9). The formation of cyanuric acid is problematic for the reason that it can cause a blocking of the particle filter and hence not only failure of the exhaust gas post treatment system but also of the internal combustion engine. The catalyst for the improvement of the release of ammonia from the reduction agent is provided such that, as schematically shown in FIG. 4, the inlet side of the particle filter 9 is charged with a catalyst material 16 that facilitates the release. Materials that can be used include $TiO_2$ or $TiO_2/SiO_2$ or $TiO^2/SiO_2/Al_2O_3$, as well as zeolites. The provision of an appropriate charge is effected analogous to the method of proceeding described above. The remainder of the illustration in FIG. 4 corresponds to that shown in FIG. 2, so that a repetition of this description can be dispensed with and reference can be had to the corresponding description regarding FIG. 2.

Figure 5:
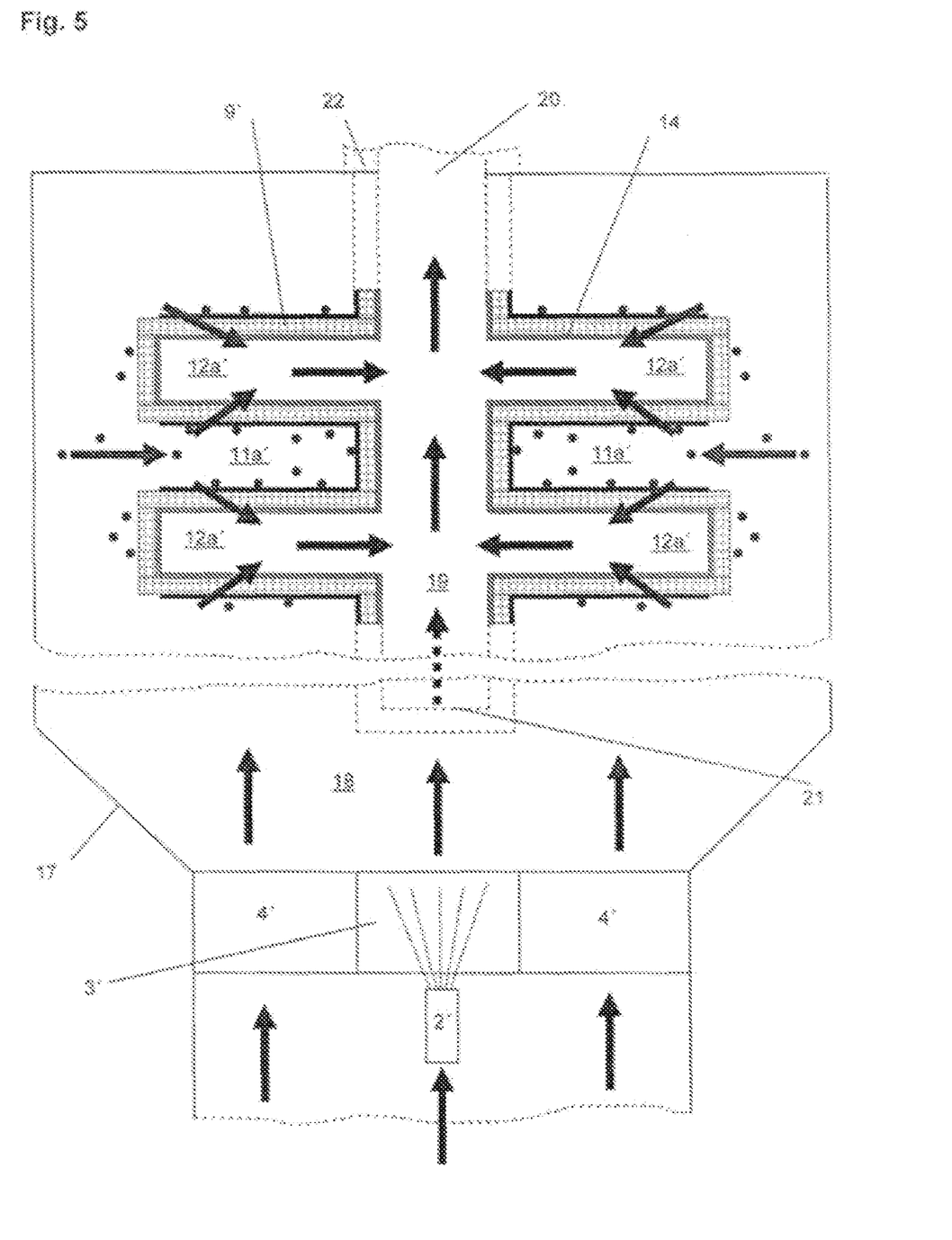
FIG. 5 shows a combination of particle filter and SCR catalyst in the exhaust gas section of an internal combustion engine.

A further embodiment of the inventive exhaust gas post treatment system is schematically shown in the cross-sectional illustration of FIG. 5. Furthermore, FIG. 5 indicates the arrangement of the exhaust gas post treatment system in a housing integrated into the exhaust gas section of an internal combustion engine.

A particle filter 9', which is embodied in the shape of an accordion, and that forms pockets 11a' on the inlet side and pockets 12a' on the outlet side, is charged on that side thereof that faces the discharge pockets 12a' with an SCR-active catalyst material 14', analogous to the example of FIG. 2. Due to the accordion-shaped configuration of the particle filter 9', an inner chamber 19 is formed that is closed at its one end 21 and at its other, open end 20 is adjoined by an outlet opening 22 of a housing 17 in which the particle filter 9' is disposed.

The interior of the housing 17 is divided by the particle filter 9' into two zones, namely the aforementioned inner chamber 19 of the particle filter 9, and the outer chamber 18 that is disposed between the wall of the housing 17 and the particle filter 9'. Disposed in the inlet region of the outer chamber 18 is an oxidation catalytic converter 4', which converts portions of the nitric oxide contained in the exhaust gas stream into nitrogen dioxide. Disposed in the center of the oxidation catalytic converter 4' is an opening that forms a partial exhaust gas stream 3' into which a reduction agent is supplied via a nozzle 2'.

As indicated in the drawing by arrows that represent the direction of flow of the exhaust gas, the exhaust gas coming from the internal combustion engine (not illustrated) initially flows through the oxidation catalytic converter 4' and in the parallel guided partial exhaust gas stream 3' receives or entrains the reduction agent, for example ammonia. The exhaust gas, which is laden with $NH_3$ and is enriched with $NO_2$, then flows from the outer chamber 18, via the pockets 11a' on the inlet side, through the particle filter 9' and its outlet side that is charged with SCR-active catalyst material 14' to the pockets 12a' on the outlet side, and leaves the arrangement via the adjoining inner chamber 19 and the outlet opening 22. On its way through the particle filter 9', the carbon particles contained in the exhaust gas are accumulated on the inlet side of the particle filter and are continuously oxidized by the $NO_2$ enriched in the exhaust gas. The nitrogen oxides carried along in the exhaust gas, together with the ammonia that is also contained therein, are converted into nitrogen and water vapor as the exhaust gas flows through the portions of the particle filter 9' that are charged with the SCR-active catalyst material 14'. The thus-cleaned exhaust gas leaves the exhaust gas post treatment system via the inner chamber 19 and the outlet opening 22. Regarding the aforementioned chemical reaction, reference is made to the already previously set forth formula relationships.

The previously described embodiments can, of course, be realized in many ways by one of skill in the art without straying from the basic inventive concept; thus, the embodiments described are provided by way of example only.

The specification incorporates by reference the disclosure of Germany priority document DE10 2006 038 288.9 filed 16 Aug. 2006.

The present invention is, of course, in no way restricted to the specific disclosure of the specification and drawings, but also encompasses any modifications within the scope of the appended claims.

What I claim is:

1. An exhaust gas post treatment system for nitrogen oxide and particle reduction in an exhaust gas stream of an internal combustion engine operated with excess air, comprising:
    a particle filter disposed in the exhaust gas stream of the internal combustion engine, wherein said particle filter is a surface-type particle filter or a deep bed filter, further wherein said particle filter is charged on an outlet side with an SCR-active catalyst material for reducing nitrogen oxide, and wherein said charging of said particle filter with said SCR-active catalyst material on said outlet side of said particle filter increases in a direction of flow of said exhaust gas; and
    means for supplying ammonia or an ammonia-releasing reduction agent to the exhaust gas stream upstream of said particle filter.

2. An exhaust gas post treatment system according to claim 1, wherein said particle filter is comprised of one of the materials of the group consisting of cordierite, silicon carbide, sintered metal, ceramic fibers, silicon fibers, and metal weave, and wherein said particle filter is coated or impregnated with an SCR-active catalyst material.

3. An exhaust gas post treatment system according to claim 1, wherein said SCR-active catalyst material, contains, as an active component, at least one of the group consisting of vanadium, $V_2O_5$, $WO_3/TiO_2$, iron-containing zeolites, copper-containing zeolites, and cobalt-containing zeolites.

4. An exhaust gas post treatment system according to claim 1, wherein said particle filter is additionally coated or impregnated on an inlet side thereof with a catalyst material that facilitates release of ammonia from said reduction agent.

5. An exhaust gas post treatment system according to claim 4, wherein said catalyst material that facilitate release of ammonia from said reduction agent contains, as an active component, at least one of the materials selected from the group consisting of $TiO_2$, $TiO_2/SiO_2$, $TiO_2/SiO_2/Al_2O_3$, and zeolites.

6. An exhaust gas post treatment system according to claim 1, wherein said particle filter is additionally coated or impregnated on said outlet side thereof, at an end of said charge with SCR-active catalyst material, as viewed in a direction of flow of said exhaust gas, with a catalyst material that is adapted to oxidize excess ammonia that is present in the exhaust gas.

7. An exhaust gas post treatment system according to claim 6, wherein said catalyst material for the oxidation of excess ammonia contains at least one of the materials selected from the group consisting of elements of the platinum group, oxides thereof, and zeolites.

8. An exhaust gas post treatment system according to claim 1, where in an oxidation catalytic converter is disposed upstream of said means for supplying ammonia or reduction agent, and wherein said oxidation catalytic converter is adapted to convert at least a portion of nitric oxide contained in the exhaust gas stream into nitrogen dioxide.

9. An exhaust gas post treatment system according to claim 8, wherein said oxidation catalytic converter contains, as active material, at least one material selected from the group consisting of platinum, platinum oxide, and zeolites.

10. An exhaust gas post treatment system according to claim 1, wherein said particle filter forms blind hole-like or pocket-like chambers not only on an inlet side but also on said outlet side of said particle filter, and wherein those chambers disposed on said inlet side are open toward said inlet side and those chambers that are disposed on said outlet side are open toward said outlet side.

\* \* \* \* \*

UNITED STATES PATENT AND TRADEMARK OFFICE
CERTIFICATE OF CORRECTION

| | | |
|---|---|---|
| PATENT NO. | : 7,856,809 B2 | Page 1 of 1 |
| APPLICATION NO. | : 11/839651 | |
| DATED | : December 28, 2010 | |
| INVENTOR(S) | : Andreas Döring | |

It is certified that error appears in the above-identified patent and that said Letters Patent is hereby corrected as shown below:

Title page, item [75]
The spelling of the inventor's name should be as follows:

Andreas Döring

Signed and Sealed this
Seventh Day of June, 2011

David J. Kappos
*Director of the United States Patent and Trademark Office*